United States Patent

Gerke et al.

[11] Patent Number: 6,068,503
[45] Date of Patent: May 30, 2000

[54] TERMINAL STRIP, ISOLATING STRIP OR CONNECTING STRIP

[75] Inventors: Dieter Gerke; Manfred Müller; Harald Bülow; Peter Meurers, all of Berlin, Germany

[73] Assignee: Krone Aktiengesellschaft, Berlin, Germany

[21] Appl. No.: 08/986,393

[22] Filed: Dec. 8, 1997

[30] Foreign Application Priority Data

Dec. 9, 1996 [DE] Germany ............ 196 52 422

[51] Int. Cl.[7] .................................. H01H 4/24
[52] U.S. Cl. ............................ 439/404; 439/853
[58] Field of Search ..................... 439/395–412, 439/851–853

[56] References Cited

U.S. PATENT DOCUMENTS

| | | | |
|---|---|---|---|
| 5,147,218 | 9/1992 | Matthews et al. | 439/404 |
| 5,417,581 | 5/1995 | Dechelette et al. | 439/393 |
| 5,562,480 | 10/1996 | Drewanz et al. | 439/404 |
| 5,718,599 | 2/1998 | Ichikawa et al. | 439/404 |
| 5,722,850 | 3/1998 | White | 439/404 |

FOREIGN PATENT DOCUMENTS

| | | |
|---|---|---|
| 28 04 478 C2 | 8/1979 | Germany . |
| 28 11 812 C2 | 11/1979 | Germany . |
| 94 00 303 | 3/1995 | Germany . |

*Primary Examiner*—Lincoln Donovan
*Attorney, Agent, or Firm*—McGlew and Tuttle, P.C.

[57] ABSTRACT

A terminal, isolating or connecting strip for telecommunications and data technology, having contact elements and having a mounting apparatus. A terminal, isolating and connecting strip of the generic type is provided, by means of which very different circuit, protection and measurement tasks in telecommunications and data technology are ensured in a very small space, with an increased wiring density, reliably and with a high level of operator convenience and clarity, it being necessary to ensure reliable separation between the functional/work areas of network operators and subscribers, is achieved in that insulation-piercing terminal contact elements 7,8 are introduced into the two insulating bodies 3,4 which are arranged at an angle with respect to one another, which insulation-piercing terminal contact elements 7,8 are formed continuously over two planes and form two rows of terminal strips 1,2 which are at an angle with respect to one another, the lower insulating body 4 having latching elements 5,6 for latching onto a profile or the mounting bracket 9 in two latching positions.

20 Claims, 7 Drawing Sheets

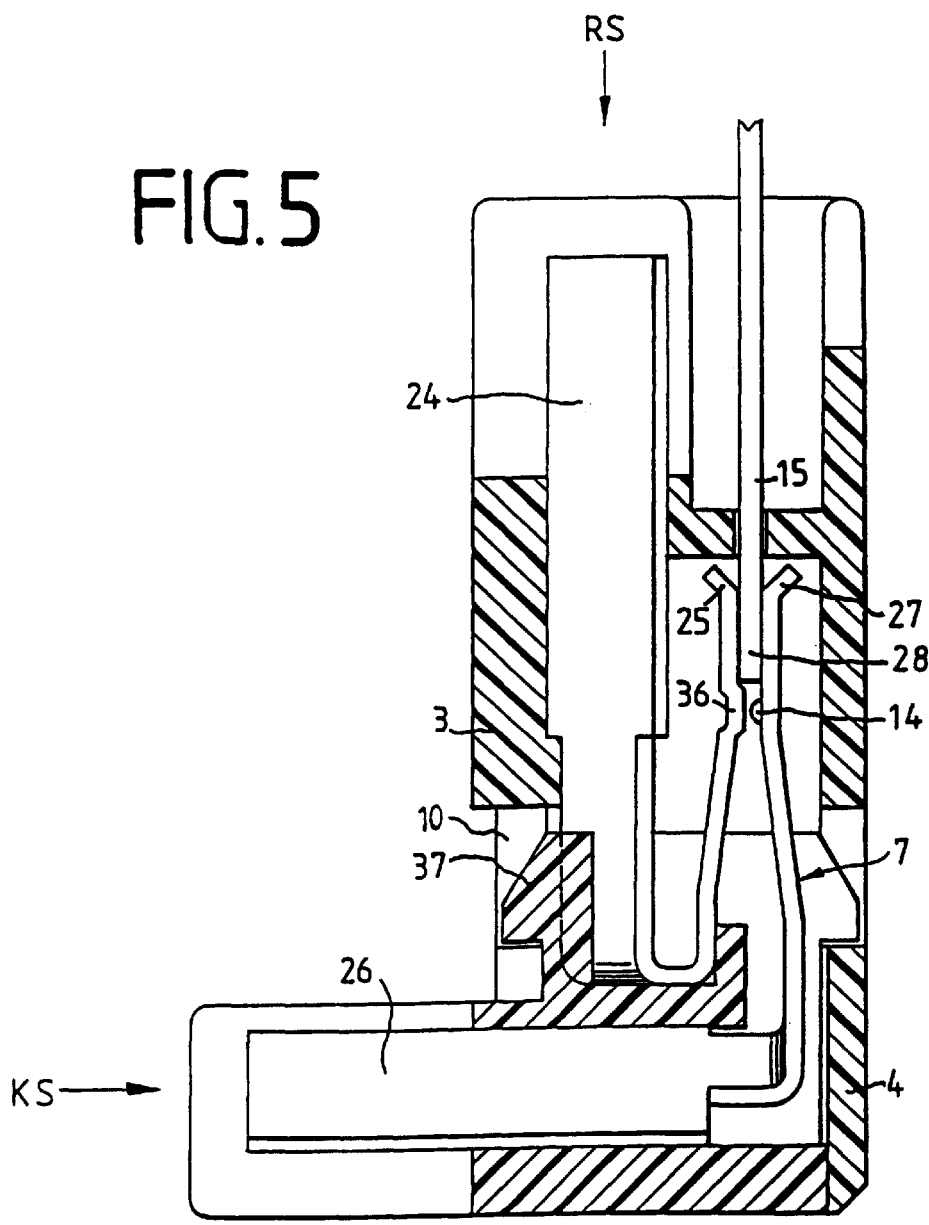
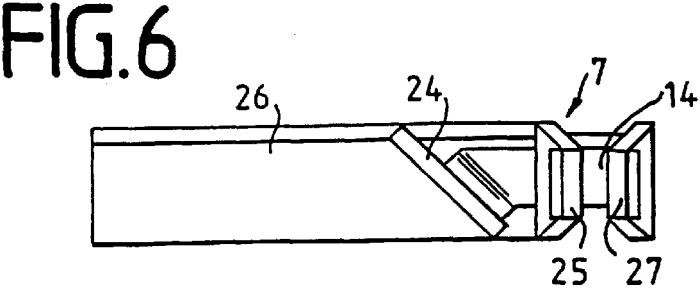

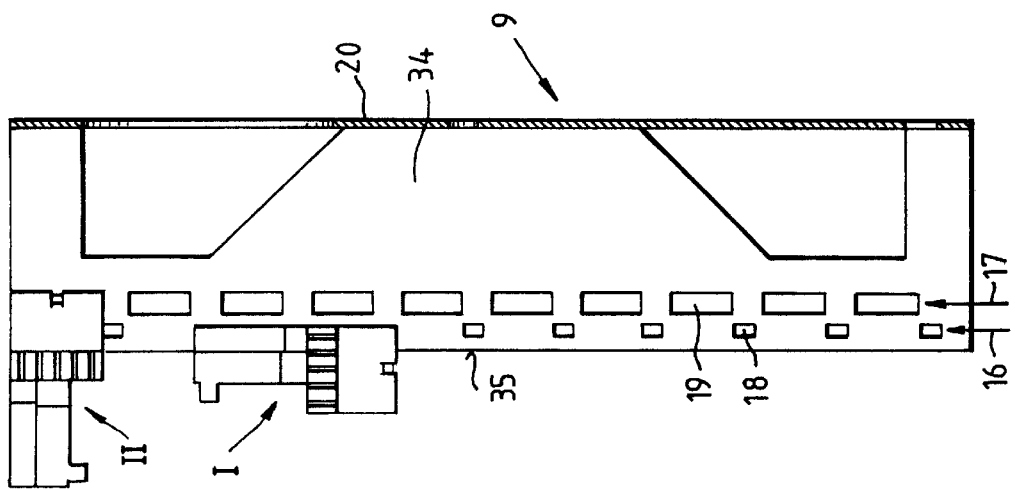
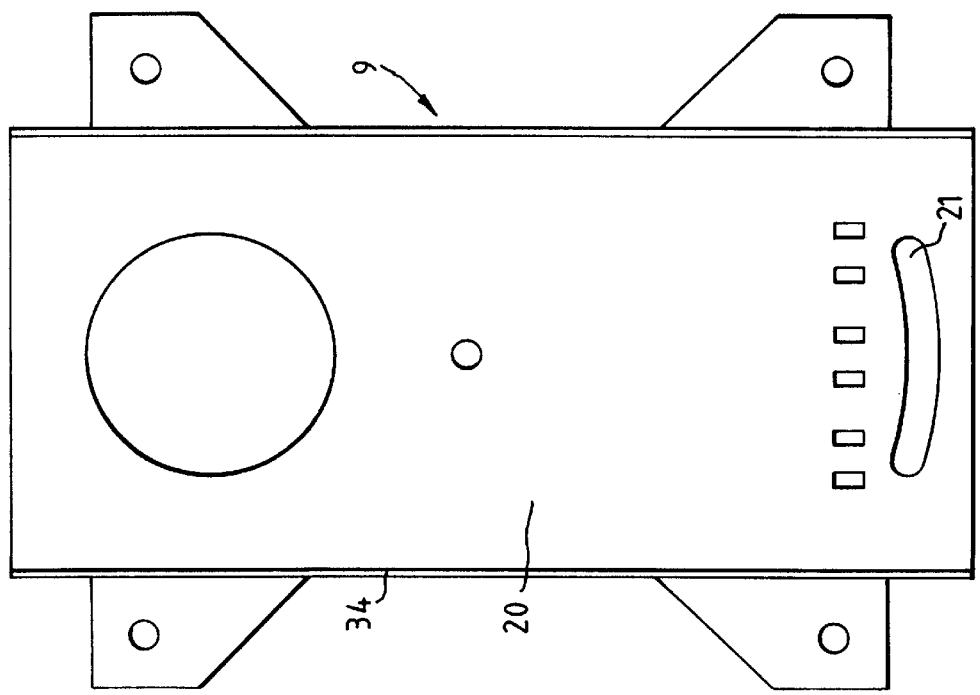

TERMINAL STRIP, ISOLATING STRIP OR CONNECTING STRIP

FIELD OF THE INVENTION

The invention relates to an electrical cable strip such as a terminal, isolating or connecting strip for telecommunications and data technology applications having contact elements and having a retaining device.

BACKGROUND OF THE INVENTION

The terminal and isolating strips which are used in telecommunications and data technology applications are fitted with insulation-piercing terminal contacts corresponding to DE 28 04 478 C2 and allow wiring in a plane. The connecting contacts on the cable core side and switching side are arranged at the same working level at the front. The strips are latched onto mounting brackets and, when necessary, can be detached from the mounting bracket again, and removed, using a guide tool. Such a mounting bracket is also described in DE 28 11 812 C2.

The strips allow, for example, standardized cable junctions having twelve terminations to be constructed to form in each case 100 twin-core cables. Expansion is possible only by the use of further terminations in a new housing. The further sealing of the wiring in the predetermined space of a cable junction necessitates miniaturization of the modules used, at the expense of the available area per contact slot in the distribution area, and thus means deterioration of the fitter's working conditions and an adverse effect on the clarity of the wiring.

The delineation of functional/work areas, which is becoming increasingly important and necessary, between the network operator and the subscriber can be achieved only with difficulty using the known telecommunications and data technology applications modules.

DE-G 94 00 303.3 describes a terminal module in which two rows of terminal strips are arranged at an angle of 90° with respect to one another. The terminal strips allow an insulation-piercing terminal technique to be used in a very small space, which avoids soldering and stripping and uses no screws, in standard connecting sockets for data and communications technology.

It is disadvantageous that only terminals are implemented. It is not possible to carry out isolation, changeover operations as well as tests and further functions.

SUMMARY AND OBJECTS OF THE INVENTION

The invention is based on the object of developing a terminal, isolating or connecting strip of the generic type, by means of very different circuit, different protection and different measurement tasks in telecommunications and data technology applications are ensured in a very small space, with an increased wiring density, reliably and with a high level of operator convenience and clarity, it being necessary to ensure reliable separation between the functional/work areas of network operators and subscribers.

According to the invention, a terminal strip, isolating strip or connecting strip is provided for telecommunication and data transfer applications having contact elements and having a retaining device. The contact elements are introduced into two insulating bodies which are arranged at an angle with respect to one another. The contact elements are formed over two planes and form two rows of terminal strips which are at an angle with respect to one another. One insulating body has fastening elements The preferably 90° angle between the two terminal strips, in conjunction with the preferably angled insulation-piercing terminal contact elements, which are continuously formed over two planes according to the invention, makes it possible to produce a universally usable strip for telecommunications and data technology applications, by means of which terminal, isolating and connecting tasks are possible as well as testing, measurement, protection and interruption-free changeover. Only the contacts need to be replaced (changed) and the corresponding functional elements, such as overvoltage protection plugs or the like, inserted in the insulating body, which is split in two.

Protection of the respective strip can be ensured by inserting a magazine or, alternatively, protection of a single twin-core can be implemented.

A considerable reduction in the dimensions of the strip and, at the same time, a considerably larger and clearer distribution panel are achieved, such that a 33% greater wiring density and, at the same time, an available area per contact slot in the distribution area which is larger by virtually 40% are achieved in a standardized cable junction.

The distribution side points towards the fitter when the strip is in the final position and allows the strip to be wired up conveniently and reliably, as well as in a visually clear manner.

Wiring the strip in two planes makes it possible to prevent manipulation of the wiring in the cable core side at the bottom by suitable measures, for example by means of a frame which can be lead-sealed.

The wiring of the strip in two planes furthermore allows separation of the functional/work areas, namely of the network operator side (the cable core side at the bottom) and the distributor side (the distribution panel at the top).

The mounting bracket, which is equipped with two latch rows, the latching openings being arranged in the side surfaces so that a smooth upper edge is retained which largely precludes any risk of injury to the fitter, ensures convenient and reliable as well as clear wiring up in the first strip latching position, and a safe final position, which can be manipulated only with difficulty and can be released only using the wiring tool, in the second latching position.

The rear side of the mounting bracket has an elongated hole which enables continuously variable adjustment of the cable strand and/or of the blocking plug just by loosening the holder, so that a plurality of cable strands can run past one another on the rear wall of the mounting bracket.

Further embodiments of the invention provide for the fastening of the strip to profile rails or via a flange to which the strip is screwed.

The invention will be explained in more detail in the following text with reference to exemplary embodiments of a terminal strip and of an isolating and connecting strip which are illustrated in the drawings The various features of the novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is a section illustration (section V—V) of the strip according to FIG. 1 with an isolating or connecting contact inserted;

FIG. 6 is a plan view of the isolating or connecting contact in FIG. 5;

FIG. 10 is a front view of the mounting bracket; and

FIG. 11 is a side view of the mounting bracket according to FIG. 10.

DETAILED DESCRIPTION OF THE PREFERRED EMBODIMENT

Figure 1:
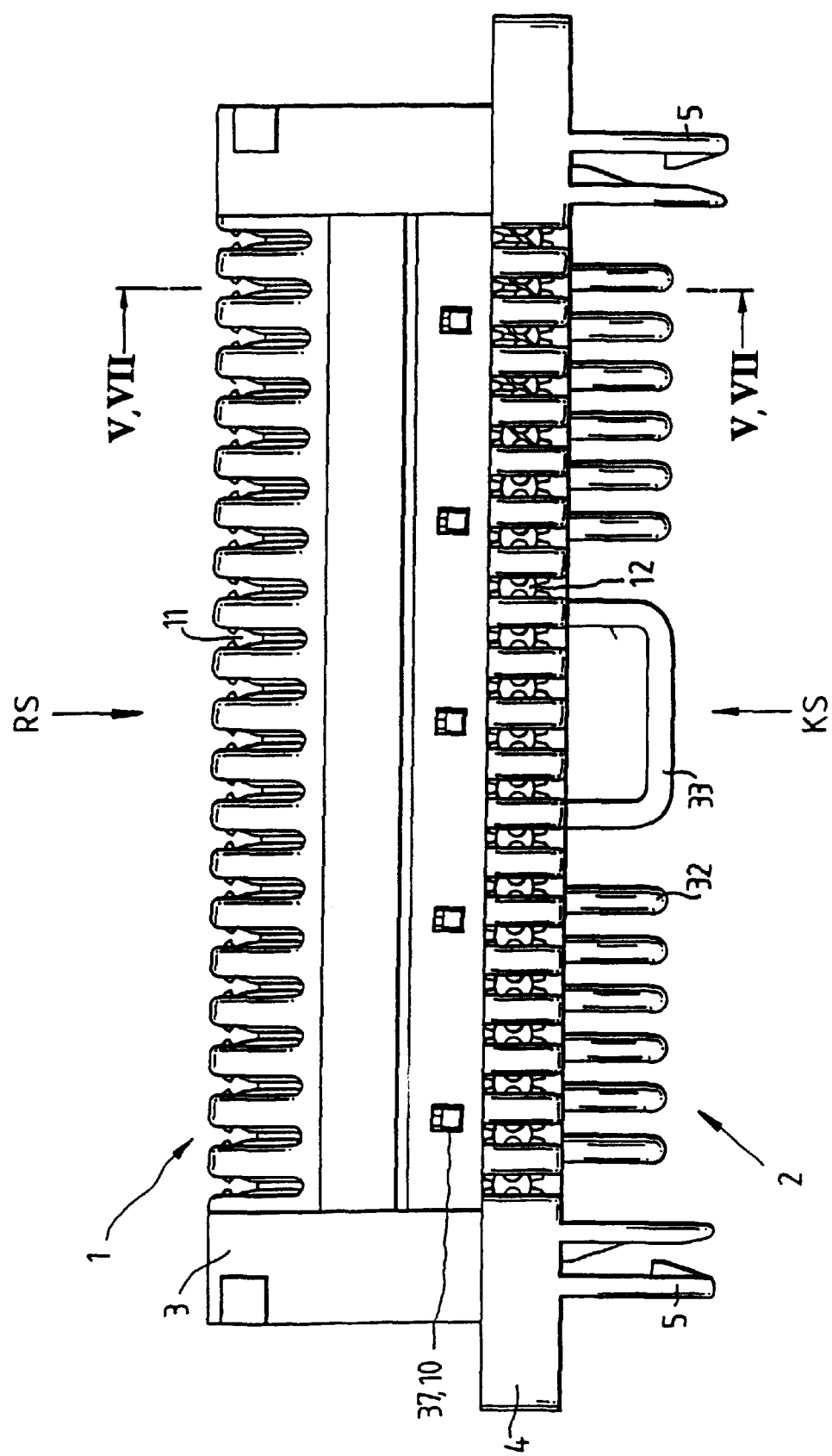
FIG. 1 is a front view of a strip formed from the insulating body which is split in two (upper part and lower part)

Referring to the drawings in particular, the invention comprises a terminal strip, isolating strip and connecting strip. The strip is preferably used for connecting plastic-insulated cable cores and insulation wires, for example in terminations in order to construct cable junctions in telecommunications local cable networks.

A termination comprises, for example, ten strips each having ten twin-core cables, retaining device or strip support terminal such as a mounting bracket 9 and a marking bracket with a plate (not illustrated), which can be used as an adapter to correct the wiring on the cable core side.

The physical design of the strips according to the invention reduces the grid size of a termination in such a manner that four terminations can now be inserted into a bay in a cable junction instead of the three terminations which have been used until now. The packing density of the connections is increased by 33%, considerably improved clarity and more space for the distribution panel being obtained at the same time.

The area available to the technician/fitter in the distribution area is increased by virtually 40% per contact slot.

As a result of the strip being wired in two planes, the cable core side is located at the bottom and the distribution panel side is rotated through 90° pointing upwards towards the fitter, and the capability to manipulate the cable core side (network operator area) can be reduced by suitable measures, for example by means of a frame which can be lead-sealed. The separation of the network operator side from the subscriber side allows the functional/work areas to be separated.

Figure 8:
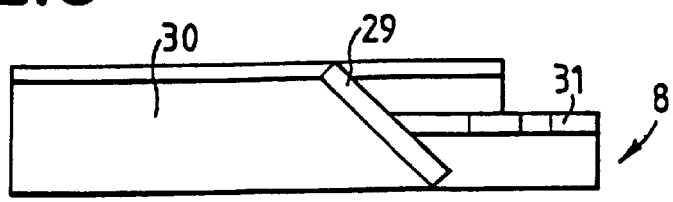
FIG. 8 is a plan view of the connecting contact of FIG. 7.

The structure of the strip can be seen from the illustrations in FIGS. 1 to 5. The insulating body of the strip is split in two and, corresponding to the illustration in FIGS. 1 to 5, comprises an upper part 3 and a lower part 4. The upper part 3 and the lower part 4 are latched to one another at an angle of 90° via latching openings 10, which are provided on both sides of the strip upper part 3, and latching hooks 37, which are provided on both sides of the strip lower part 4, once the insulating-piercing terminal contact elements 7,8 have been fitted (FIGS. 6, 8).

The insulating body which is formed by the upper part 3 and the lower part 4 (housing parts) is designed identically for the formation of different strip functions (terminal, isolating or connecting strip). The different functions of the strips are brought about just by fitting different insulation-piercing terminal contact elements according to FIGS. 6 and 8, and by fitting additional peripheral magazines or the like.

In accordance with the illustration in FIG. 1, the terminal strip 1 which is formed in the upper part 3 has contact slots 11, and the terminal strip 2 which is formed in the lower part 4 has contact slots 12 which are at an angle of 90° with respect to one another and via which wiring in each case takes place.

The terminal strip 1 forms the distribution side RS for connection of the outgoing wires on the subscriber side, and the terminal strip 2 forms the cable side KS for connection of the incoming wires from the network operator.

FIG. 1 furthermore shows the known means 32, 33 for cable core routing, and the latching elements 5 for latching the strip onto a mounting bracket 9 (FIGS. 10, 11) or onto a profile which is not illustrated. The strips can be arranged in rows as required.

Simply latching the strips onto the mounting bracket 9 saves time-consuming screw tightening work and also offers the capability, if required, for individual strips to be unlocked easily from the mounting bracket 9 with the aid of an unlocking blade which can be folded out of the wiring tool, which is not illustrated.

Figure 2:
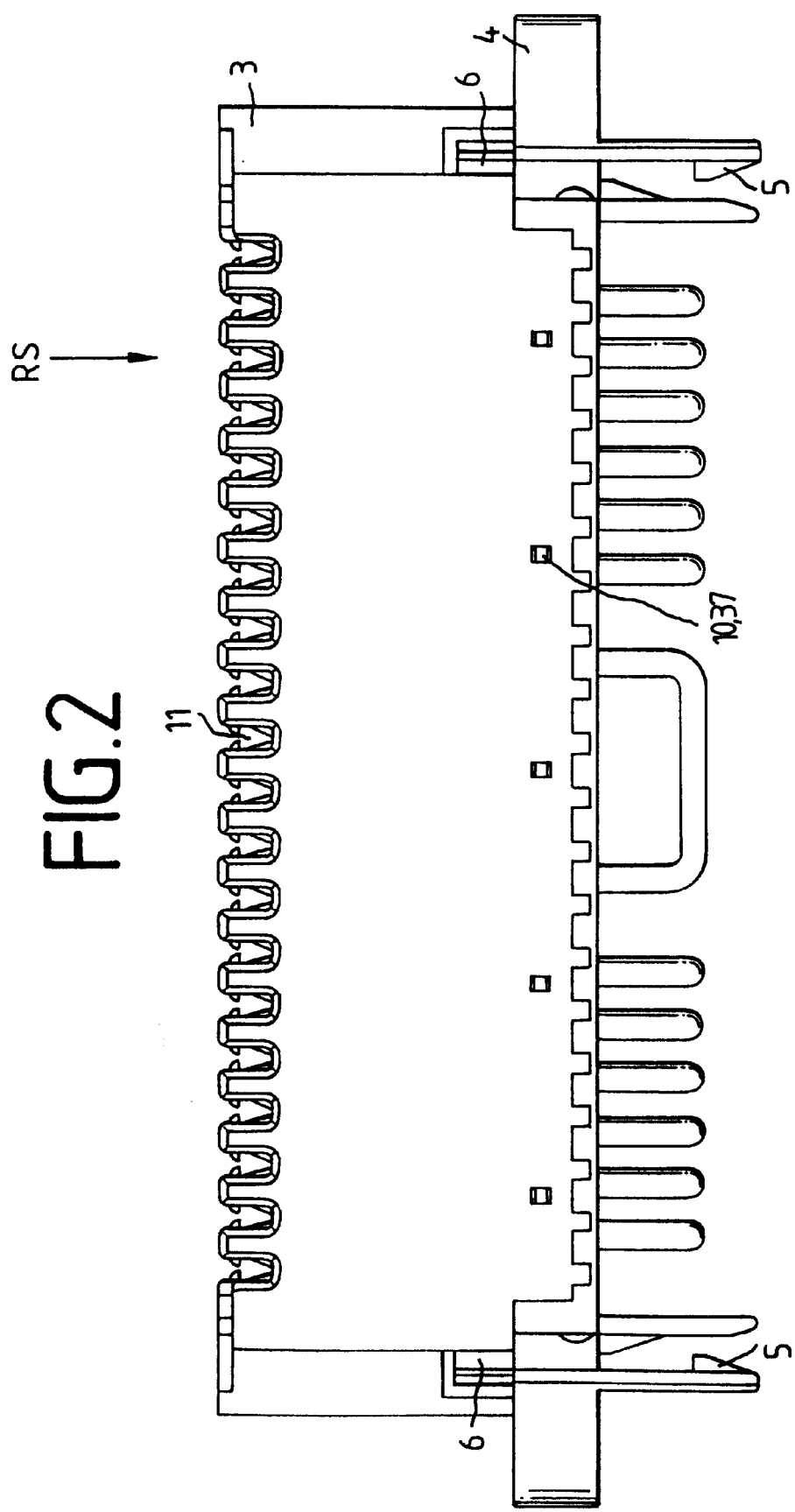
FIG. 2 is a rear view of the strip, according to FIG. 1.
Figure 3:
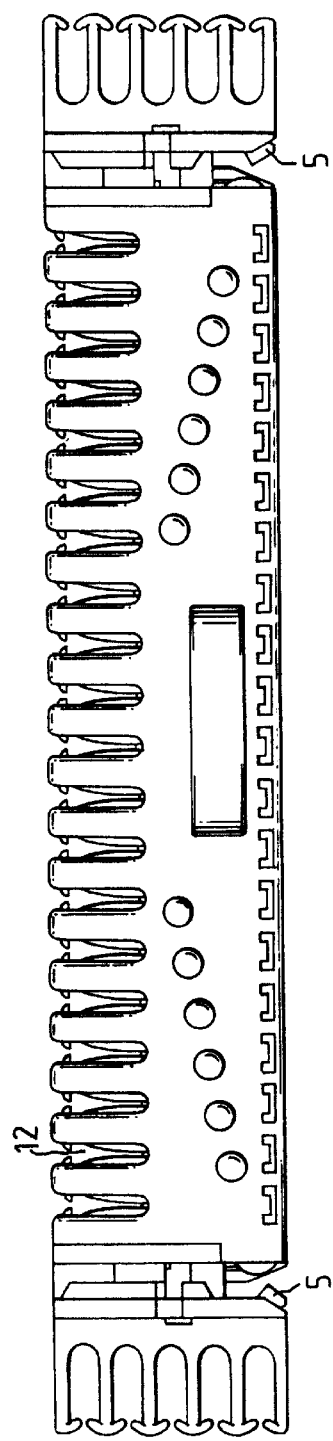
FIG. 3 is a bottom view of the strip according to FIG. 1.

In accordance with the illustration of the mounting bracket 9 in FIGS. 10 and 11, the strips are latched onto the mounting bracket 9 in two positions. Two latch rows 16 and 17 in the side walls 34 of the mounting bracket 9 are shown in FIG. 11. For convenient wiring up of the strip with the incoming cable cores on the cable side KS, the strip is initially moved into its wiring position I (FIG. 11) and, to do this, latched into the latching openings 18 in the latch row 16 by the latching elements 6 (FIG. 2). After this, the strip is detached and is latched into the final position II by a 90° rotation, with the latching elements 5 (FIGS. 1 to 4) latching into the latching opening 19 in the latch row 17 (FIG. 11). The latching of the strip in the final position II can be released only by unlocking the latch using the unlocking blade, while the latching in the wiring position I can be released without any aids. This results in the visually clear distribution panel which is considerably larger than that in the prior art, faces the fitter, and ensures reliable and convenient wiring.

The incorporation of the latching openings 18,19 in the side walls 34 of the mounting bracket 9 has the advantage that the edges 35 of the side walls 34 are smooth and do not cause any risk of injury while fitting the strip.

In accordance with the illustration in FIG. 10, the mounting bracket 9 has an elongated hole 21 for infinitely variable adjustment of the cable strands or of the blocking plugs, which allows the cable strands to be routed past one another on the rear wall of the mounting bracket 9 without completely loosening the holder.

Figure 4:
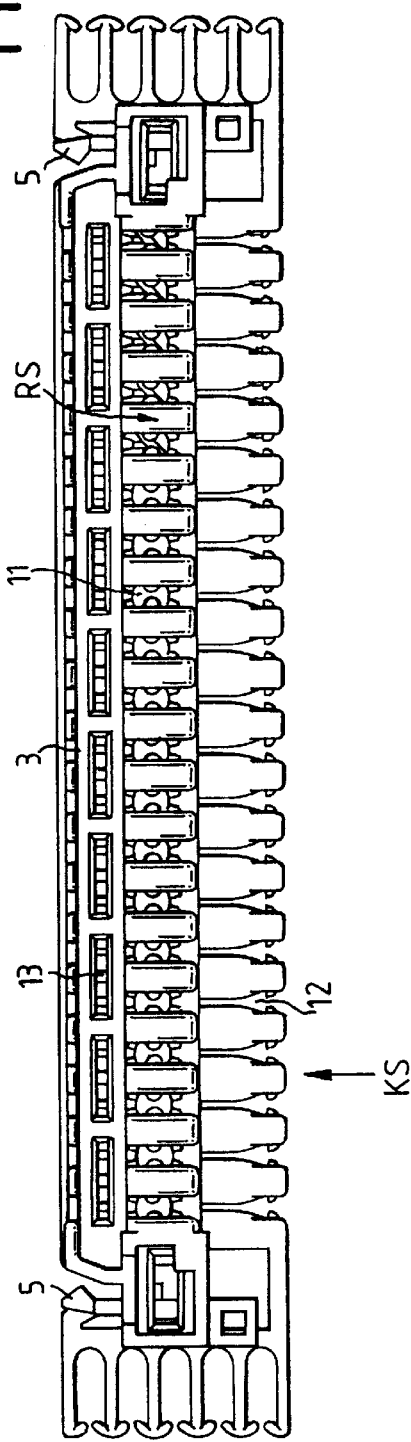
FIG. 4 is a top view of the strip according to FIG. 1.

FIG. 4 shows the plan view of the strip as it is presented to the fitter when the strip is latched onto the mounting bracket 9 in the final position II. The contact slots 11 and 13 face the fitter on the distribution panel side RS, and the contact slots 12 are rotated through 90° with respect to this, on the cable side KS.

In accordance with the section illustration in FIG. 5, the strip is designed as an isolating or contact strip as a result of an isolating contact element 7 being fitted.

The isolating contact element 7 according to FIGS. 5 and 6 is formed from a U-shaped insulation-piercing terminal connecting contact 24 having a pick-off contact 25, and from an L-shaped insulation-piercing terminal connecting contact 26 having a pick-off contact 27.

The two pick-off contacts 25, 27 form a function pick-off 28 in the plane of the distribution side RS, via which a pick-off 15 of any required function element, which is not illustrated, is inserted in order to carry out a desired function, for example overvoltage protection. An isolating point 14 can also be designed as a connecting point by the angle 36 in the pick-off contact limb 25 being omitted and the contact limb 25 continuing in a straight line.

The outgoing cable cores of the subscribers are connected to the insulation-piercing terminal connecting contact 24, and the incoming cable cores from the network operator are connected to the insulation-piercing connecting contact 26, which is rotated through 90° with respect to the connecting contact 24.

FIG. 6 shows a plan view of the insulation piercing terminal contact element 7 (isolating contact).

Figure 7:
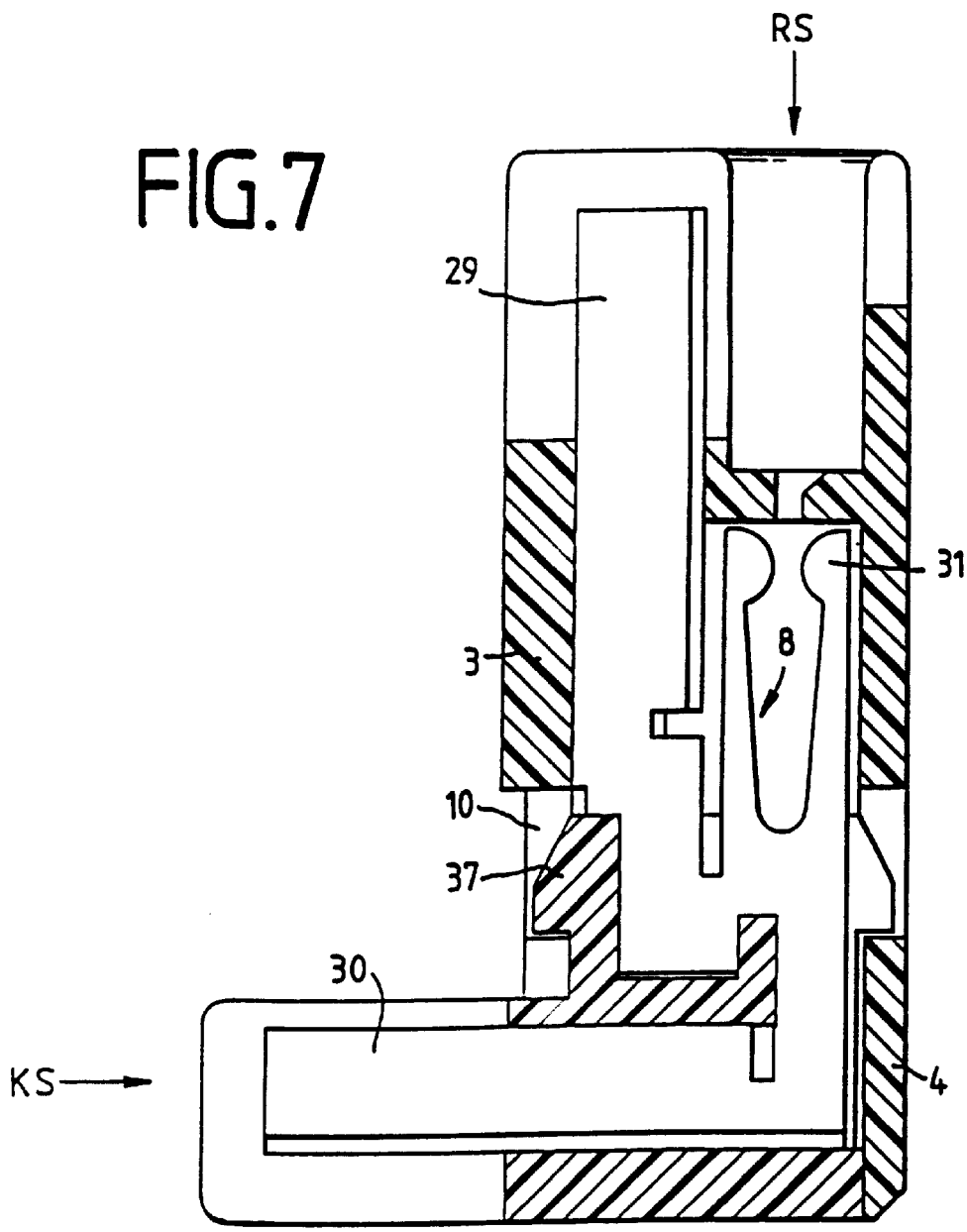
FIG. 7 is a sectional view (section VII—VII) of the strip according to FIG. 1 with a connecting contact inserted.

FIG. 7 shows the section illustration of a strip which is configured with insulation-piercing terminal connecting contacts 8 to form a terminal strip.

The insulation-piercing terminal connecting contact 8 is formed integrally from two insulation-piercing terminal connecting contacts 29, 30, which are arranged at an angle of 90° with respect to one another, and from a function pick-off 31.

The function pick-off 31 and the insulation piercing terminal connecting contact 29 are accessible from the distribution side RS, and the insulationpiercing terminal connection 30 can be wired up from the cable side KS.

FIG. 8 shows a plan view of the insulation piercing terminal connecting contact 8, as is used in the strip according to FIG. 7. The insulation-piercing terminal connecting contact 29 is accordingly angled through 45° with respect to the function pick-off 31.

Figure 9:
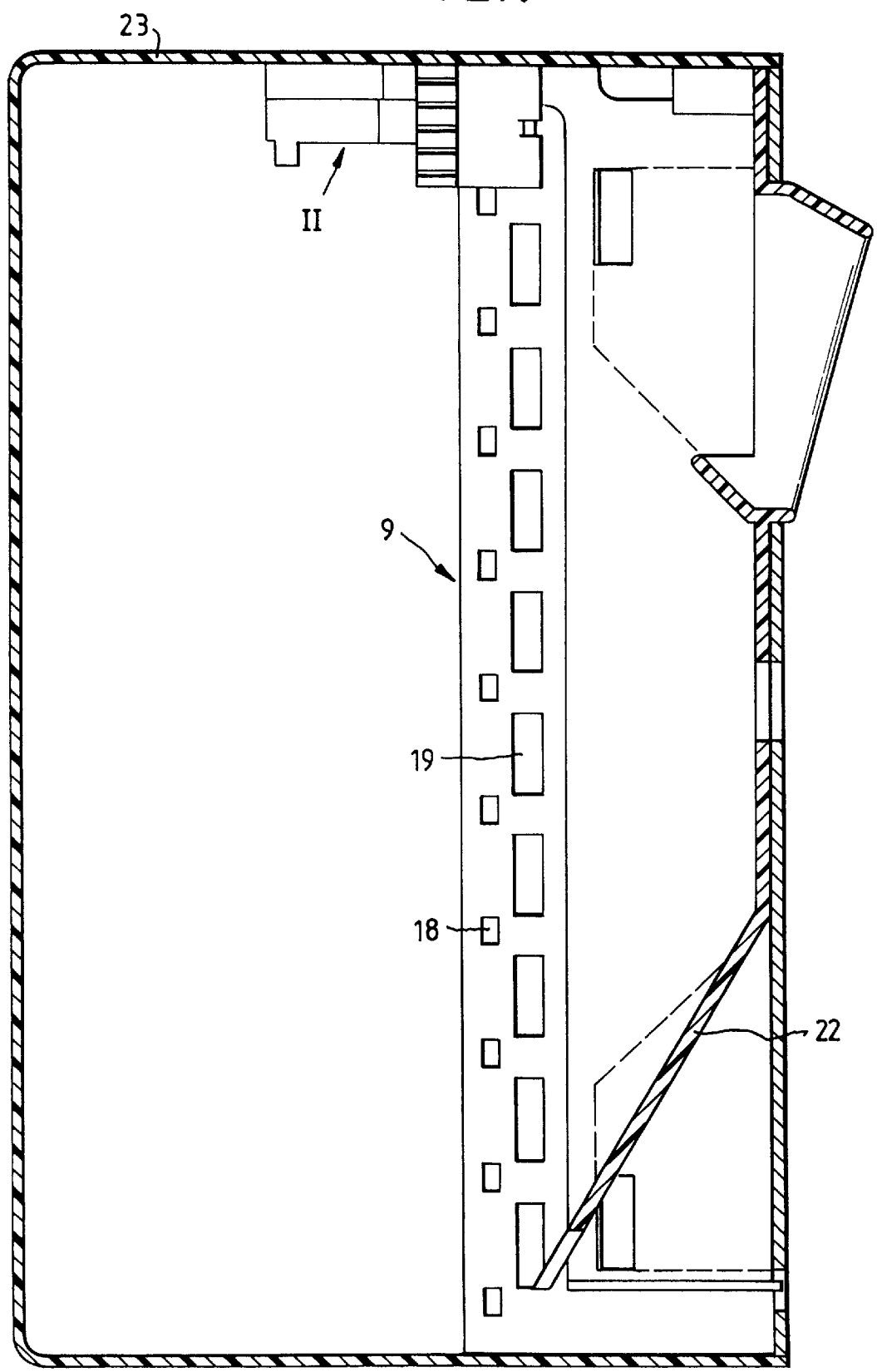
FIG. 9 is a sectional view of a cable junction with an insertion recess, mounting bracket with strip, protective dust cap.

FIG. 9 shows, in a schematic section illustration, how the contact elements of a strip which is latched onto the mounting bracket 9 are largely protected against dirt and the formation of condensation by latching an insertion recess 22 onto the mounting bracket 9, and by means of a protective dust cap 23.

While specific embodiments of the invention have been shown and described in detail to illustrate the application of the principles of the invention, it will be understood that the invention may be embodied otherwise without departing from such principles.

What is claimed is:

1. An electrical cable strip for telecommunications and data technology applications with a retaining device, the strip comprising:
   an insulating body;
   another insulating body arranged at an angle with respect to said insulating body;
   a first row of contact elements introduced into said insulating body and forming a first plane;
   a second row of contact elements introduced into said another insulating body and forming a second plane, said first and second planes being at an angle with respect to one another; and
   one of said insulating body and said another insulating body having first and second mounting latching elements for independently latching onto the retaining device in first and second latching positions, said first position providing said first row of contacts in an accessible position, and said second position providing said second row of contacts in said accessible position.

2. The strip as claimed in claim 1, wherein said first and second rows of contact elements are insulation-piercing terminal contact elements introduced into said insulating body and said another insulation body respectively, said insulation-piercing terminal contact elements being formed over said first and second planes and forming said first and second rows of terminal strips which are at an angle with respect to one another.

3. The strip as claimed in claim 1, wherein the retaining device is formed by one of a mounting bracket and a profiled rail.

4. The strip as claimed in claim 1, wherein said retaining device is formed by a flange to which the strip is screwed.

5. The strip as claimed in claim 1, wherein said insulating body is connected to said another insulating body at an angle of preferably 90°.

6. The strip as claimed in claim 2, wherein said insulation-piercing terminal contact elements are formed from a U-shaped insulation-piercing terminal connecting contact having a pick-off contact and from an L-shaped insulation-piercing terminal connecting contact having a further pick-off contact, said two pick-off contacts forming a function pick-off.

7. The strip as claimed in claim 2, wherein said insulation-piercing terminal contact elements are formed integrally from a function pick-off and from two insulation-piercing terminal connecting contacts which are arranged at an angle of 90° with respect to one another.

8. The strip as claimed in claim 3, further comprising a first latch row with latching openings for latching the strip on said mounting bracket in said first latching position, and a second latch row with latching openings for latching the strip on said mounting bracket in said second latching position, said first latching position being a wiring position and said second latching position being a final position, the latching openings for the wiring position being arranged laterally offset between the latching openings for the final position of the strip.

9. The strip as claimed in claim 3, wherein said mounting bracket has an elongated hole in its rear wall for infinitely variable adjustment of one of cable strands and blocking plugs.

10. The strip as claimed in claim 3, wherein said mounting bracket is connected to an insertion recess and to a protective dust cap in order to prevent dirt on the contact elements.

11. The strip as claimed in claim 1, wherein a frame which can be lead-sealed is provided in order to prevent manipulations on a cable core/network side.

12. The strip as claimed in claim 3, wherein a marking plate, which can be used as an adapter, is provided on said mounting bracket in order to correct the wiring of a strip on a cable core/network side.

13. The strip as claimed in claim 1, wherein said strip can be arranged in rows on said retaining device.

14. The strip according to claim 1 wherein said strip is movable into a wiring position via one of said latching elements and said strip is releasable and movable into a final position by rotation through about 90° via one of said latching elements.

15. A telecommunications and data technology applications arrangement, comprising:
   a terminal strip support element; and
   at least one terminal/isolating/connecting strip including:
      an insulating body,
      another insulating body arranged at an angle with respect to said insulating body,
      a contact element introduced into said insulating body;
      another contact element introduced into said another insulating body, said contact element and said another contact element being formed over two planes and forming two rows of terminal strips which are at an angle with respect to one another, and first and second mounting fastening elements for each independently fastening one of said insulating body and said another insulating body to said terminal strip support element in first and second angularly spaced positions, said first position providing a first row of said two terminal strips in an accessible position, and said second position providing a second row of said two terminal strips in said accessible position.

16. An electrical cable strip arrangement comprising:

a strip support element;

an insulating body connectable to said strip support element;

a first row of contact elements arranged in a first plane in said insulating body;

a second row of contact elements arranged in a second plane in said insulating body, said first plane being angularly spaced from said second plane;

a first mounting latch connecting said insulating body to said strip support element in a first position with said first row of contact elements being accessible;

a second mounting latch connecting said insulating body to said strip support element in a second position with said second row of contact elements being accessible, said second position being angularly spaced from said first position, said second mounting latch operating independently from said first mounting latch.

17. The arrangement in accordance with claim 16, wherein:

an angular difference between said first and second planes of said contact elements is substantially equal to an angular difference between said first and second latching positions.

18. The arrangement in accordance with claim 16, wherein:

said contact elements of said first row have an insertion direction;

said contact elements of said second row have an insertion direction angularly spaced from said insertion direction of said first row.

19. The arrangement in accordance with claim 16, wherein:

said first position directs said first row in a direction outward from said strip support element;

said second position directs said second row in a direction outward from said strip support element.

20. The arrangement in accordance with claim 18, wherein:

each of said contact elements of said first row are electrically connected to one of said contact elements of said second row;

said first and second planes are angularly spaced by substantially 90 degrees;

said first position directs said first row in a direction outward from said strip support element;

said second position directs said second row in a direction outward from said strip support element;

an angular difference between said first and second planes of said contact elements is substantially equal to an angular difference between said first and second positions, and also substantially equal to an angular difference between said insertion directions of said first and second rows.

* * * * *